(12) United States Patent
Hiscox

(10) Patent No.: US 6,217,622 B1
(45) Date of Patent: Apr. 17, 2001

(54) METHOD AND APPARATUS FOR PRECIPITATING AND CLASSIFYING SOLIDS IN HIGH CONCENTRATIONS

(75) Inventor: Bryan Hiscox, Rigaud (CA)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/178,022

(22) Filed: Oct. 22, 1998

(51) Int. Cl.$^7$ ................................. B01D 9/00; C01F 1/00
(52) U.S. Cl. .................. 23/293 R; 23/295 R; 423/111; 423/112; 423/127
(58) Field of Search ........................ 423/121, 122, 423/127, 111, 115, 119; 23/293 R, 295 R

(56) References Cited

U.S. PATENT DOCUMENTS

| | | |
|---|---|---|
| 2,653,858 | 9/1953 | Brown . |
| 3,632,310 * | 1/1972 | Johnson ................................. 23/143 |
| 3,649,184 | 3/1972 | Featherston . |
| 4,049,773 | 9/1977 | Mejdell et al. . |
| 4,305,913 * | 12/1981 | Anjier ................................. 423/123 |
| 4,511,542 * | 4/1985 | Anjier et al. ......................... 423/127 |
| 4,512,959 * | 4/1985 | Pohland et al. ...................... 423/121 |
| 4,818,499 | 4/1989 | Chantriaux et al. . |
| 5,163,973 * | 11/1992 | Ellis ..................................... 23/301 |
| 5,529,761 * | 6/1996 | Brown et al. ......................... 423/121 |

FOREIGN PATENT DOCUMENTS

| | | |
|---|---|---|
| 2616182 | 10/1976 | (DE) . |
| 0467617 | 1/1992 | (EP) . |

OTHER PUBLICATIONS

Chem. Abst. 110:24, Jun. 12, 1989, No. 215606, p. 172 (abstract of CN 86,107,429).
Boxell, ed., Light Metals 1988 Conference Proceedings, 1988, pp. 181–185.

* cited by examiner

Primary Examiner—Steven P. Griffin
Assistant Examiner—Eileen E. Nave
(74) Attorney, Agent, or Firm—Cooper & Dunham LLP

(57) ABSTRACT

A method of forming and classifying a precipitate containing large, coarse and fine particles from a super-saturated precipitating mother slurry, e.g. sodium aluminate from the Bayer process. The method comprises separating the precipitating mother slurry into a plurality of separate streams, introducing each stream into a vessel provided with an agitated lower zone and a quiescent upper zone to form the precipitate, with the large and coarse particles remaining as a slurry in the agitated lower zone and the fine particles migrating to the quiescent zone, removing product slurry from the lower agitated zone, and removing spent liquor containing the fine particles from the quiescent upper zone. The invention also provides apparatus for carrying out the method. The combined precipitation and partial classification (separation of fine particles) makes it possible to deal with high solids charges increasingly encountered in industrial processes.

15 Claims, 3 Drawing Sheets

METHOD AND APPARATUS FOR PRECIPITATING AND CLASSIFYING SOLIDS IN HIGH CONCENTRATIONS

BACKGROUND OF THE INVENTION

I. Field of the Invention

This invention relates to a method of and apparatus for the precipitation and classification of solids from mother liquors (slurries) in industrial processes. More particularly, although not exclusively, the invention relates to the precipitation and classification of alumina hydrate from aluminate liquors during the Bayer process for the production of alumina from bauxite.

II. Background Art

In the Bayer process, hydrated aluminum oxide in bauxite is digested at elevated temperature and pressure with concentrated sodium hydroxide solution to form a solution of sodium aluminate. The solution is separated from the remaining insoluble materials (red mud) and is then cooled so that it becomes super saturated. Seed crystals of alumina hydrate are added and a precipitate is produced. Coarse crystals of the resulting precipitate are separated as a product stream intended for drying and calcination to produce alumina. Fine crystals are removed for use in the process and the remaining sodium aluminate (spent liquor) is recycled to the digestion step for use with the caustic hydroxide solution.

In the American variant of the classic Bayer process, it is normal to classify the precipitation discharge stream into large particles (product), a coarse seed fraction and a fine seed fraction. The fine seed is then subjected to an agglomeration process in high ratio sodium aluminate liquor to reduce the number of particles present. This allows the production of a coarse strong product which is not otherwise attainable.

Commercial pressure to increase liquor (sodium aluminate) productivity, and hence the production yield from existing equipment, leads to the use of higher and higher concentrations of caustic sodium hydroxide. The desire to complete the crystallization in a defined time period then leads to higher and higher seed charges. The resultant higher solids content in the precipitation discharge stream makes the conventional separation and classification equipment difficult to operate and/or inefficient or ineffective. In particular, the separation of a fine fraction from a thick (dense) slurry is difficult, although the separation of large (product) particles from a coarse seed fraction is somewhat less difficult. Difficulties of separation are generally encountered at solids concentrations of greater than about 300 gpl solids.

One way of dealing with the need for a high content of solids in contact with precipitating liquor is to make use of the "dense bed" concept. Basically, this concept is the use of a vessel to produce a higher solids concentration in the vessel than the feed to the vessel by removing an underflow of dense slurry and an overflow containing little solid. Generally, this involves introducing the precipitating liquor and seed charge into a tank or other vessel having a lower zone where the precipitated solids is kept in turbulent agitation suitable for crystal growth and an upper non-turbulent zone where solids from the lower zone may enter and sediment back into the lower zone. By transferring an underflow stream and an overflow stream separately into the next tank in a series, it is possible to increase the solids content in the lower zone in comparison with the solids content of the combined feed streams.

However, it is then still necessary to classify the resulting product into the required product, coarse and fine fractions, and this is difficult at high solids contents, as indicated above.

The use of dense bed precipitators in the Bayer process has been suggested in the past, e.g. in U.S. Pat. No. 3,649,184 issued to Richard H. Featherston on Mar. 14, 1972 and U.S. Pat. No. 4,049,773 issued to Glør Mejdell et al. on Sep. 20, 1977. These patents are discussed in the following.

U.S. Pat. No. 3,649,184 discloses a process and apparatus for the production of alumina hydrate by creating a different kind of precipitation circuit which uses only one kind of seed material. The process involves continuously introducing aluminate liquor and fine seed slurry into the first of a series of precipitation stages, each stage containing aluminate liquor lower in ratio of alumina to caustic soda concentration than the preceding stage but higher in ratio than the succeeding stage, maintaining in each stage a quiescent region for the separation of fine alumina hydrate particles, and continuously transferring aluminate liquor and entrained fine particles from the quiescent region of each stage to the succeeding stage. The stages employ dense bed precipitators having an upper quiescent region and a lower agitated region. Coarser particle material accumulates in the vessels and each vessel is underflowed periodically to a classification device. Liquid and slightly finer material is returned to the vessel from which it came to maintain the flow conditions in the precipitator chain. This process requires the modification of the entire conventional system to operate as a series of dense bed precipitators.

U.S. Pat. No. 4,049,773 discloses a process in which aluminate mother liquor is passed countercurrent to the direction of feed of aluminum hydroxide crystals through a plurality of stages each with a dense bed type of configuration. Again, this requires a modification of the entire conventional process to operate with dense bed precipitators. Moreover, it is believed that, if attempted on a commercial scale, this invention would cause uncontrollable scaling, coupled with an inability to control the production of the fines necessary to maintain the process.

Accordingly, while the use of dense bed precipitators has been suggested in the past, the systems disclosed have required complete plant refits or the construction of new plants. The capital outlay is thus considerable. Moreover, the results have not been of great benefit. There is therefore a need for a method and apparatus that can handle higher precipitate densities as part of otherwise conventional Bayer plant equipment.

SUMMARY OF THE INVENTION

An object of the present invention is to provide a method of and apparatus for forming and classifying the precipitation product produced by the Bayer process or other similar processes requiring relatively fine grained solids (generally crystals) in high concentrations to contact a liquid.

Another object is to provide a method and apparatus that can be used to modify existing Bayer process equipment, and similar equipment, to handle high solids charges.

Another object is to simultaneously bring about precipitation at high solids contents and partial classification of the precipitation product.

According to one aspect of the invention, there is provided a method of forming and partially classifying a precipitate containing large, coarse and fine particles from a super-saturated precipitating mother slurry, comprising separating the precipitating mother slurry into a plurality of separate streams, separately and simultaneously introducing each stream as a slurry feed into a vessel provided with an agitated lower zone and a quiescent upper zone to form said precipitate, continuously removing product slurry as an underflow from the lower agitated zone of each vessel, and continuously removing spent liquor as an overflow from said quiescent upper zone, wherein said slurry feed, said underflow and said overflow are maintained such that said large and coarse particles accumulate as a slurry in the agitated lower zone of each vessel and only said fine particles exit said vessel with said overflow after migrating through the quiescent zone.

According to another aspect of the invention, there is provided, in a particle precipitation system having a particle agglomeration zone, a particle growth zone, and a classification zone, wherein large, coarse and fine particles formed as a precipitate are separated from each other, the large particles are collected as product, at least some of the coarse particles are directed to the particle growth zone and at least some of the fine particles are directed to the agglomeration zone, the improvement which comprises separating a precipitating mother slurry exiting said particle growth zone, prior to said classification zone, into a plurality of separate streams, separately and simultaneously introducing each stream as a slurry feed into a separate vessel provided with an agitated lower zone and a quiescent upper zone to form said precipitate, continuously removing product slurry as an underflow from the lower agitated zone of each vessel, directing said underflow to said classification zone, and continuously removing spent liquor as an overflow from said quiescent upper zone, wherein said slurry feed, said underflow and said overflow are maintained such that said large and coarse particles accumulate as a slurry in the agitated lower zone of each vessel and only said fine particles exit said vessel with said overflow after migrating through the quiescent zone, and directing said fine particles from said overflow to said agglomeration zone.

According to yet another aspect of the invention, there is provided a method of producing an alumina hydrate product from a pregnant liquor of sodium aluminate solution obtained from the digestion of alumina from bauxite, comprising the steps of: introducing at least some of the pregnant liquor at a temperature in the range of about 70 to 80° C. into a particle agglomeration zone together with fine particles of alumina hydrate to cause said fine particles to agglomerate into coarse particles; passing said pregnant liquor and coarse particles from said agglomeration zone into a growth zone and adding further coarse particles of alumina hydrate to cause a precipitate of alumina hydrate to commence to form in said growth zone, thus forming a precipitating mother slurry; separating the precipitating mother slurry into a plurality of separate streams, and introducing each stream into a vessel provided with an agitated lower zone and a quiescent upper zone to form said precipitate comprising large, coarse and fine particles, with said large and coarse particles remaining as a slurry in the agitated lower zone and said fine particles migrating to said quiescent zone; removing slurry from the lower agitated zone; removing spent liquor containing said fine particles from said quiescent upper zone; recirculating said fine particles from said upper zone to said agglomeration zone; classifying said slurry from said lower zone to separate said large and said coarse particles from each other; recirculating said coarse particles to said growth zone; and extracting said large particles as an alumina hydrate product.

According to yet another aspect of the invention, there is provided apparatus for forming and classifying a precipitate containing large, coarse and fine particles from a supersaturated precipitating mother slurry, comprising a vessel, an agitator for agitating a slurry of said large and said coarse particles in said lower zone of the vessel while leaving an upper zone containing said fine particles quiescent, a delivery line for introducing said precipitating mother slurry into the vessel, an outlet line for removing slurry from said lower zone, an overflow outlet for removing spent liquor and entrained fine particles from said upper zone, a density monitor for slurry in the lower zone, a flow control for controlling flow of slurry through said first outlet line, and a controller for operating said flow control in response to signals from said density monitor to cause said slurry flow to decrease when said density of said slurry in the lower zone falls.

According to yet another apparatus for producing an alumina hydrate product from a pregnant liquor of sodium aluminate solution obtained from the digestion of alumina from bauxite, comprising: a particle agglomerator for contacting fine alumina hydrate particles with caustic sodium aluminate solution; a particle growth vessel for contacting solution from the agglomerator with a coarse precipitate to cause precipitation of alumina hydrate to commence, thereby forming a precipitating mother slurry containing large, coarse and fine particles; a plurality of dense bed precipitator/classifier vessels for receiving precipitating mother slurry directly from the agglomerator for completing said precipitation and for separating spent liquor containing fine particles from a slurry of said large and coarse particles; a classifier for separating large particles and said coarse particles from said slurry containing said large and said coarse particles; and feed lines for interconnecting said agglomerator, said particle growth vessel, said dense bed precipitator/classifiers and said classifier, such that super saturated sodium aluminate solution is passed first through said agglomerator, then through said particle growth vessel, the precipitating mother slurry is then divided into separate streams passed to said dense bed precipitator/classifiers, the fine particles in spent liquor are recirculated from an upper zone of said dense bed precipitator/classifiers to said agglomerator, slurry from a lower zone of the dense bed precipitator/classifiers is passed to said classifier, large product particles are removed from the classifier and coarse particles are recirculated to said particle growth vessel.

The terms "large", "coarse" and "fine" used to describe particle sizes may have different meanings for different processes. Basically, however, the "fine" particles are those that are so small that they travel with (e.g. essentially at the same speed as) the surrounding liquid, even when said liquid moves upwardly. Large particles are generally those of intended product size. Coarse particles are those that tend to move less quickly than surrounding liquid when said liquid moves upwardly, and thus tend to settle back to form a dense layer. For many processes, fine particles are those of $65\mu$ or smaller, coarse particles may be $70\mu$ or larger and large particles may be $90\mu$ or larger. There may be some overlap between the sizes of large and coarse particles, since these particles are often interchangeable (i.e. some of the product particles may be used as coarse particles for process steps).

For the American Sandy Bayer process, the terms usually mean the following:

| | |
|---|---|
| Fine particles (fine seed) | 45–65μ Median, QS* 20 |
| Coarse particles (coarse seed) | 70–100μ Median, QS 40 |
| Large particles (product) | 90–120μ Median, QS 40 |

*QS means "quartile spread. A median size is specified. 25% of the total mass lies below the lower quartile, 75% of the total mass lies below the upper quartile, and the difference in size between these quartiles is 20μ or 40μ).

Depending on the size of the fine particles to be separated, the upward flow of liquid in the quiescent zone of each vessel is selected such that only the fine particles are entrained in the liquid removed from the vessel (the vessel overflow). This generally requires a slow rate of upflow and is the reason why the precipitating mother slurry is first divided into several (two or more) streams for parallel treatment in several dense bed precipitator vessels, i.e. the overall rapid flow of mother slurry is maintained while the upflow in each treatment vessel is kept to the required minimum by simultaneous parallel treatment of streams of the mother slurry. The number of vessels required for this purpose can be calculated from the combined feed rate of the precipitating mother slurry and the desired overflow rate of each vessel required for a proper partial classification effect.

In this way, the present invention may be used with conventional precipitator equipment without requiring extensive equipment modifications. It is merely necessary to provide several dense bed vessels of conventional size (surface area) fed directly from the particle growth area using multiple feed pipes. Further classification of product particles from coarse particles then requires simple classification equipment of a conventional kind.

In particular, the method of the invention makes it possible to precipitate and partially classify (remove the fine particles from) a mother slurry at high solids concentrations. With the invention, it is possible to effect fines separation and allows "in-vessel" solids concentrations to go above 300 gpl solids, e.g. 500–700 gpl solids, while maintaining the feed at 300 gpl solids (the method creates an increase of solids content due to the dense bed principle). The resulting concentration factor is determined by dividing the feed flow to a vessel by the underflow.

In a preferred form, the invention (as it relates to the treatment of Bayer liquors) can be summarized in the following way. After passing through a conventional agglomeration/precipitation circuit the sodium aluminate flow is:

a) Divided among a plurality of tanks arranged to have a well mixed lower zone topped by a quiescent upper section so that the feed rate is preferably between 3.0 and 6.0 m$^3$/hour per m$^2$ of liquid surface area, more preferably between 4.0 and 5.0 m$^3$/hour/m$^2$.

b) The feed flow is divided between a controlled withdrawal from the well-agitated dense phase and a decantation from the thin quiescent upper section such that the overflow is preferably at a rate between 0.5 and 3.0 m$^3$/hour per m$^2$ of liquid surface area, more preferably between 1.0 and 2.0 m$^3$/hour/m$^2$.

c) Solids are separated from the overflow and used as fine seed for the agglomeration section of the precipitation circuit.

d) The underflow stream is fractionated into a coarse product stream, which is routed for further processing, and a slightly finer stream from which solids are separated for use as coarse seed for the growth section of the precipitation circuit.

The dense bed precipitator is preferably a draft tube agitated precipitator operated with a high tank level and a low feed flow. A partly clarified stream, containing only fine hydrate particles, may be decanted from the top of the tank. An underflow, enhanced in coarse material and in solids content, may be taken as a controlled flow from the lower levels of the tank.

The apparatus of the invention may be provided at the outlet of a conventional agglomeration/growth precipitator chain to separate a fine fraction of precipitated hydrate for subsequent agglomeration. The resulting separation of fine and large/coarse hydrate streams may be used to improve or eliminate subsequent classification steps.

DETAILED DESCRIPTION OF THE PREFERRED EMBODIMENTS

The present invention makes use of the dense bed principle for product concentration and partial classification. This relies on Stokes law of settling, i.e. large particles settle faster than small particles. In a draft tube agitated tank, there is a high speed fully turbulent flow down a central vertical submerged draft tube. The flow, as it emerges from the bottom of the draft tube, sweeps out across the floor of the tank and then rises slowly in the annular space, which normally has at least 10 times the projected area of the draft tube. At the level of the top of the draft tube, the flow turns and accelerates to re-enter the draft tube. If there is a suitable volume of liquid above the upper level of the draft tube that is kept quiescent and that rises to an overflow, fine particles travel upwardly with the liquid and exit the vessel via the overflow, whereas coarse particles settle out of the quiescent zone and re-enter the turbulent zone. Hence, if the respective flow rates (feed, underflow and overflow) are properly controlled and maintained, the fine particles can be classified out of the product stream via the overflow stream (that will contain only a small quantity of fine particles). Coarse particles settle against the rising stream in the annulus, but are generally still swept up and return to the draft tube, i.e. they recirculate, but at a speed slower than the liquid. Large particles tend to settle at the bottom of the vessel.

As an example, a vessel may be fed at 1000 m$^3$/hour at 250 gpl (grams per litre) mixed solids, and the vessel underflowed at 500 m$^3$/hour, with the remainder overflowing. Because of the partial classification effect, the overflow will contain very little solids (all of which will be fine). After a short time, the vessel will come into mass balance, so that the amount of solids input will equal the amount of solids output, but essentially all of the solids leave the vessel in the underflow, which is at half the feed rate as the input. Hence, the gpl solids in the underflow will be twice that in the feed. This increase in solids applies to the whole of the circulating liquid in the vessel below the quiescent zone, i.e. it has a "dense bed."

Figure 1:
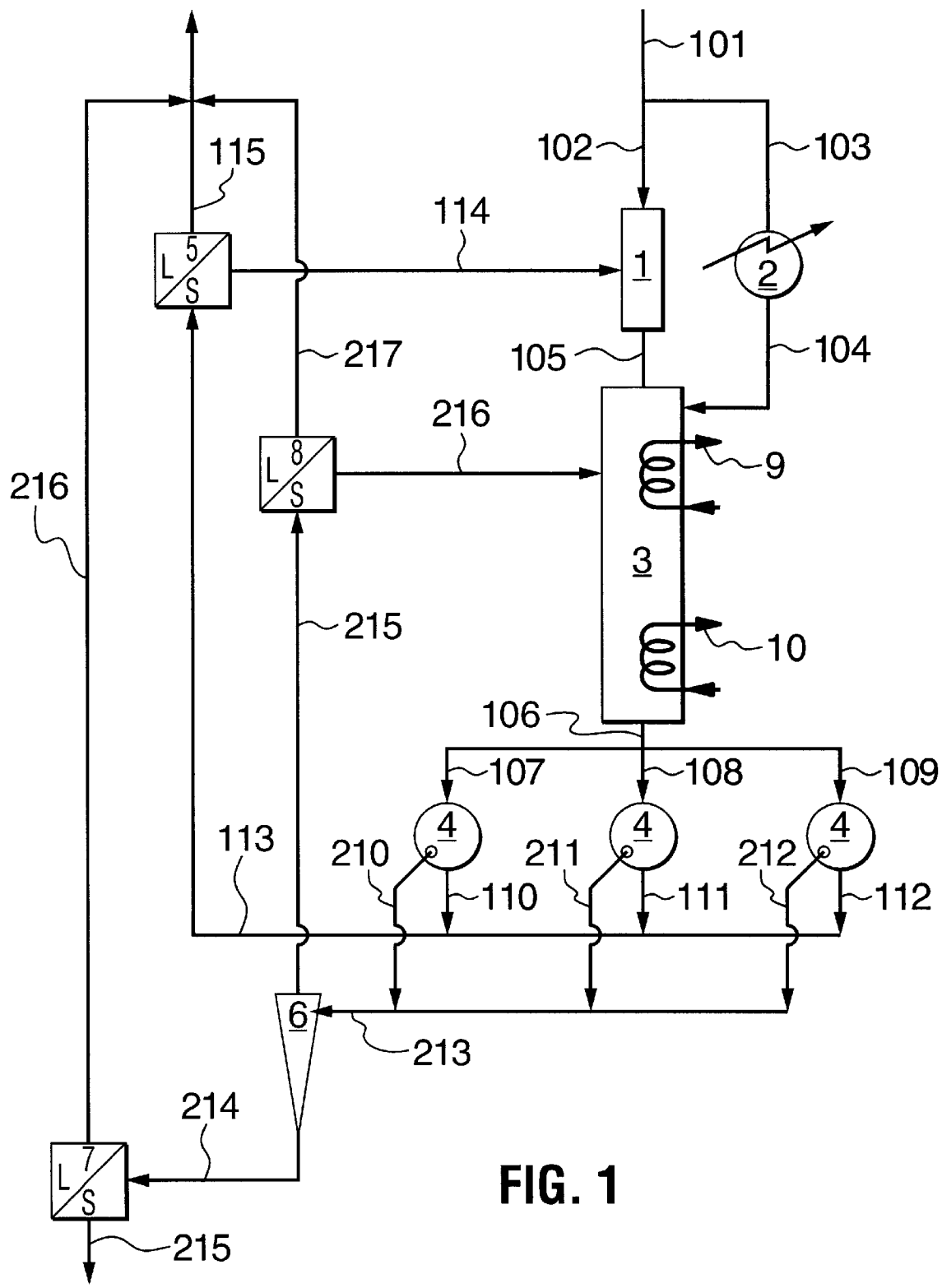
FIG. 1 is a schematic representation of a conventional Bayer process precipitation circuit incorporating precipitation and classifying equipment according to one preferred embodiment of the present invention.

In FIG. 1, numerals 1 and 3 represent a conventional precipitation circuit which agglomerates a fine fraction of seed separately from the coarse seed fraction. Hot pregnant liquor at a preferred temperature of 70 to 80° C. is supplied to the agglomeration section 1 by lines 101 and 102. Fine seed is added through line 114 and, after a residence time in the agglomeration section 1 in the preferred range of 2–24 hours, more preferably 4–8 hours, the agglomerated slurry stream is transferred to a growth section 3 via line 105. Optionally, part of the pregnant liquor flow may be routed directly to the growth section 3 via lines 103 and 104 and via an optional cooler 2.

The growth section 3 is supplied with coarse seed via line 216. Sections 1 and 3 are preferably equipped with continuous draft tube agitated precipitators, but may employ any other form of precipitation, continuous or batch, air-lift or mechanical agitation. The only requirement is that the fine seed is separated from the coarse seed for agglomeration purposes. Cooling and dense bed sections are optional. In FIG. 1, these elements are represented by the cooling coils 9, 10.

Line 106 carries the precipitator discharge stream into the apparatus of the invention. The flow is divided between a plurality of dense bed/classifying precipitators 4 (three such precipitators are shown, but more or less—e.g. 2 to 5—could be provided, depending on the flow rate in the line 106) by lines 107, 108, 109 such that the feed flow to each tank is between 3.0 and 6.0 m$^3$/hour per m$^2$ of liquid surface area, more preferably between 4.0 and 5.0 m$^3$ per hour per m$^2$ of surface area. From these tanks 4 an overflow stream is decanted via lines 110, 111 and 112. An underflow stream is taken from the lower sections of the tanks via a dip pipe and lines 210, 211 and 212.

The overflow streams 110, 111 and 112 are consolidated in line 113, and routed to a liquid/solid separator 5. This separator may be of any conventional kind, e.g. a gravity separator, cyclone, sieve or preferably a filter. From separator 5, the solids are returned to the agglomeration section 1 as fine seed via line 114, and the clarified liquor is routed for further processing via line 115. It will be understood that any form of carrying liquid may be added to the solids to increase their fluidity, such as spent liquor, pregnant liquor, various process wash streams or water. Also any form of seed treatment, such as washing, heating, ultrasonic activation, etc., may be applied between separator 5 and agglomeration section 1.

The underflow streams removed through lines 210, 211, 212 are controlled by a valve mechanism linked to apparatus for monitoring the density of the tank contents, and are consolidated in line 213 which feeds a classifying device 6. This may be one or more gravity settlers, hydrodynamic separators, screens or preferably a small number of large diameter cyclones. A product sized fraction is taken from the classifier 6 via line 214 to a solid/liquid separation device 7 which separates product solids via line 215 for further washing, filtration, calcination, etc. Solid/liquid separator 7 may be any form of gravity separator cyclone, sieve, screen or preferably a filter. The remaining clear liquid stream passes via line 216 to join the spent liquor flow in line 115.

The undersized fraction from classifier 6 is taken via line 215 to a further solid/liquid separation device 8 which may be any form of gravity separator, hydrocyclone, sieve, screen or preferably a filter. The clarified liquor passes by line 217 to join the stream 115, and the solids are routed as coarse seed to the growth section 3 via the line 216. It will be understood that any form of carrying liquid may be added to the solids for the purpose of the transportation, e.g. spent liquor, pregnant liquor, various process wash streams or water. Any form of seed treatment may also be applied between separation device 8 and growth section 3.

The dense bed/classification can be achieved in any vessel which has a well mixed lower zone topped by a quiescent upper zone acting as a settling section. A draft tube agitated precipitator, e.g. as shown in FIG. 2, is particularly well adapted to this purpose.

Figure 2:
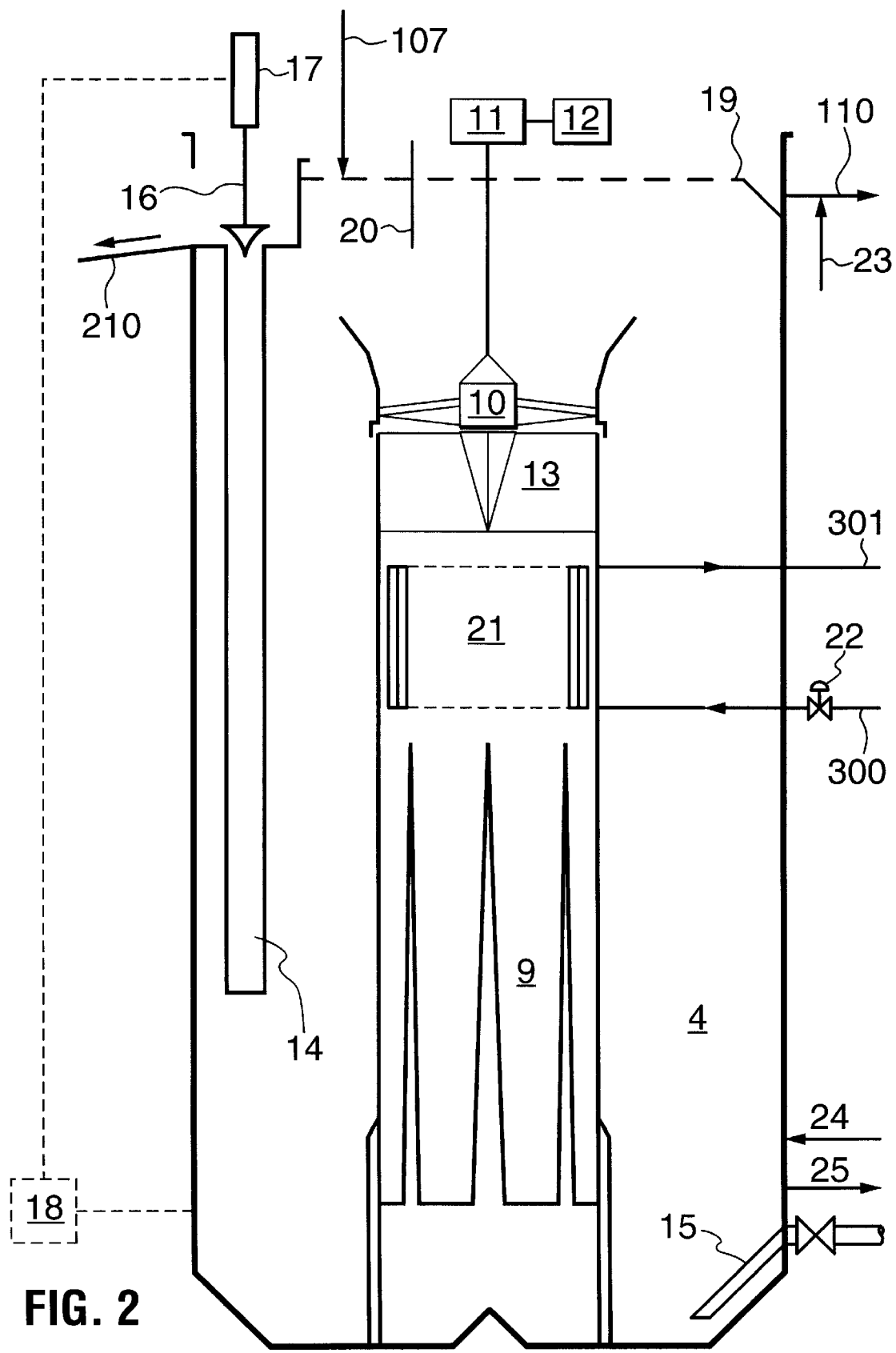
FIG. 2 is a vertical cross-section of an embodiment of a standard precipitator modified to carry of the method of the invention.

FIG. 2 shows a draft tube agitated precipitator 4, equipped with a draft tube 9 slotted for operation at high solids contents. The precipitator uses a propeller 10, gearbox 11 and an electric motor 12 to generate a downward flow in the draft tube, passing straightening vanes 13. A cooling system 21, controlled by valve 22 and supplied by lines 300, 301, is optional.

The remainder of the normal equipment is represented by a riser pipe 14 feeding a regular outlet 210, and a tank drainage system 15. Facilities for filling and emptying the tank with spent liquor or cleaning caustic are represented by the connections 23, 24, 25.

The conversion to dense bed/classifying duty is achieved by adding a high level weir or submerged pipe take-off device 19 to decant a thin slurry from the top of the tank via line 110. The tank is caused to overflow by throttling the normal discharge via riser pipe 14 and line 210 using a valve 16 driven by an actuator 17 which is regulated by a pressure monitor 18 reading the pressure near the bottom of the tank, which may be used to infer the solids content of the tank. A baffle 20 is used to prevent short-circuiting of feed from line 107 directly to the overflow 19. The pressure monitor 18, actuator 17 and valve 16 ensure that the density of the dense bed is maintained within predetermined limits by varying the underflow through pipe 14, this being desirable for operational purposes. While the position of valve 16 affects the rate of travel of the spent liquor through the quiescent zone and through the overflow, this variation can normally be accommodated without unacceptably changing the size of the particles forming the fine fraction emerging from the quiescent zone.

The system may be retrofitted to any existing agglomeration/growth precipitation circuit as an adjunct to an increased seed charge. Its greatest benefits will be realised by minimising the equipment needed in new circuits.

In a modern high productivity circuit, the filters 5, 7 and 8 will be installed to minimize spent liquor recirculation through the valuable precipitator volume. The dense bed/classifying tanks 4 form an essential part of the precipitation volume.

The only additional classification equipment needed consists of the cyclone(s) 6. Because these cyclones are used only to separate the coarsest fraction from a coarse stream at 400–700 gpl, they can be relatively large (having a cut size about 90 $\mu$), and may be fed using the gravity head between the top of the precipitators and their installation point. The filters 5, 7 and 9 can be installed adjacent to the cyclones or adjacent to the solids discharge destination as dictated by the site conditions.

Figure 3:
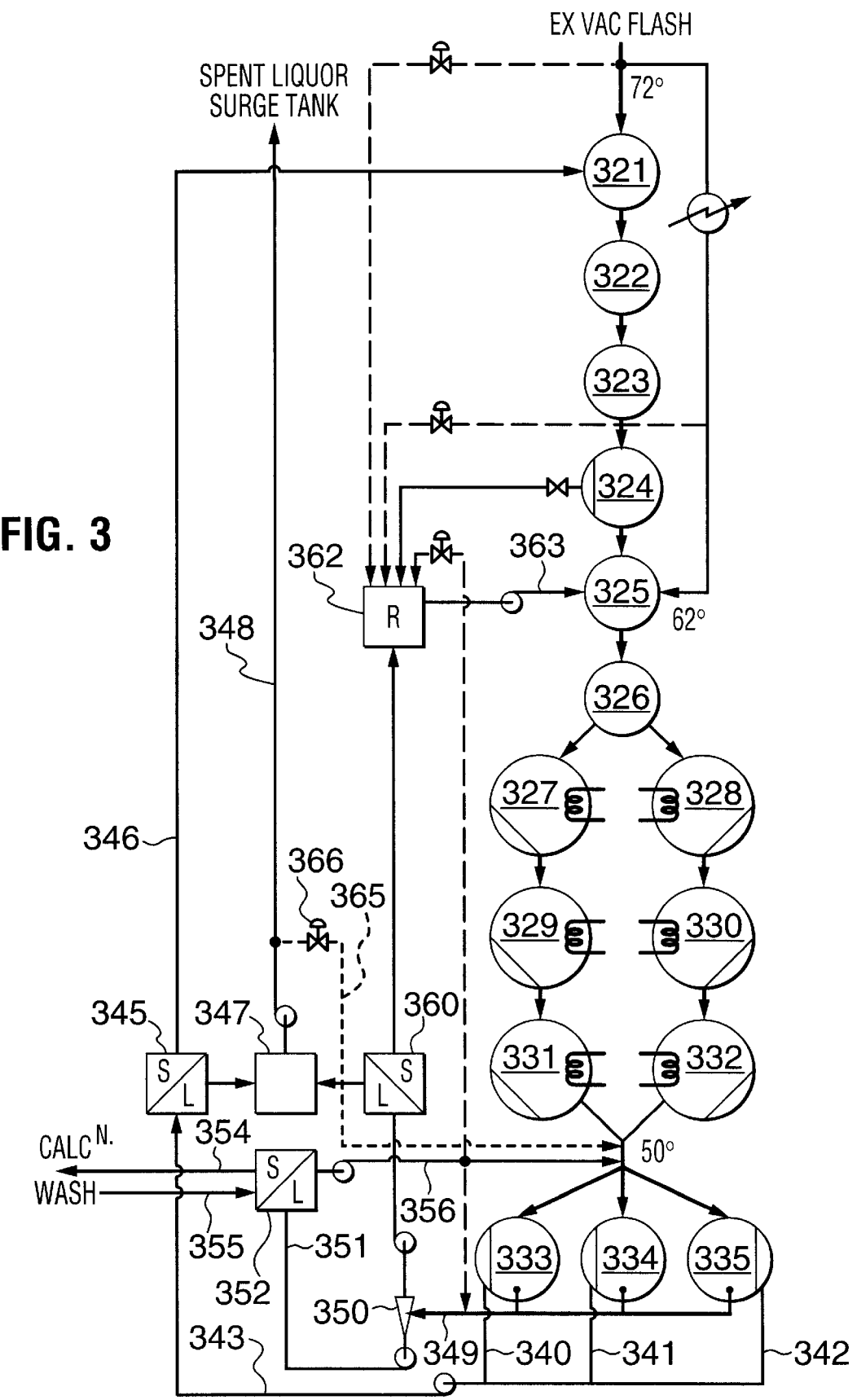
FIG. 3 is a representation similar to FIG. 1 showing and alternative precipitation circuit according to the invention.

FIG. 3 shows an alternative precipitation circuit according to the invention. In this circuit, agglomeration takes place in three sequential agglomerators 321, 322 and 323 and crystal growth takes place in three sequential growth section tanks 324, 325 and 326, and then in six cooled dense bed precipitators 327–332 arranged in two parallel groups each of three sequential tanks. The flows from final precipitators 331 and 332 are re-combined and then divided into three separate flows directed to dense bed classifiers 333, 334 and 335. The overflows from these classifiers (containing fine crystals) are fed via pipes 340, 341, 342 and 343 to a solid/liquid separator 345. The separated fine seed is fed via pipe 46 to the first agglomeration tank 321. The separated spent liquor is fed to a collection tank 347 and then, via pipe 348, to a spent liquor surge tank (not shown). The underflow from classifiers 333, 334, 335 flows to a cyclone classifier 350 via pipe 349 for separation of product and coarse particles. The fraction containing product particles is forwarded to a solid/liquid separator 352 via pipe 351. The separated solids is then removed for calcination at 354. The combined separated spent liquor and wash liquid (introduced at 355) is recycled via pipe 356 to the flow to the dense bed classifiers 333, 334, 335. The fraction from the classifier 350 containing coarse particles is forwarded to a solid/liquid separator 360. The separated spent liquor is moved to the collection tank 347 and hence to the spent liquor surge tank (not shown) via pipe 348. The separated coarse particles are fed to a receiving tank 362, mixed with feed solution, and introduced into growth tank 325 via pipe 363.

A principal difference between the circuit of FIG. 1 and that of FIG. 3 is the provision of a re-direct pipe 365 between the spent liquor pipe 348 and the feed to the dense bed classifiers 333, 334, 335. This feed is controlled by valve 366 and can be shut off entirely, if required. The advantage of this re-direct flow of solids-free spent liquor is that it can be used to dilute the slurry fed to the dense bed classifiers. Essentially, this can increase the volume of liquid passing to the overflow pipes 340, 341 and 342 for any given bed density, thus ensuring that the overflow (and removal of fine crystals) is always maintained regardless of the volume of the underflow, and that there is sufficient upward movement of liquor through the quiescent zones of the dense bed classifiers to adequately remove the fine crystals. The valve 66 may be controlled automatically, if desired, by monitoring the volume of overflow from the dense bed classifiers.

The circuit of FIG. 3 minimizes the pumping power required (e.g. due to parallel rows of growth tanks 327–332) and facilitates the control of the particle separation (e.g. due to the re-direct pipe 365).

EXAMPLE

A prototype dense bed classifier vessel of the type shown in FIG. 2 was constructed and operated in a precipitation circuit according to the present invention. The test conditions and results are shown in Table 1 below.

TABLE 1

| Classifying Dense Bed Precipitator | | | |
| --- | --- | --- | --- |
| | Feed | Underflow | Overflow |
| Flow (m³/hr) | 755 | 499 | 253 |
| Solids (gpl) | 290 | 423 | 30.3 |
| Ratio (AC*) | .403 | .379 | .379 |
| Caustic (gpl) | 236.1 | 237.1 | 237.3 |
| Median ($\mu$) | 99.8 | 100.1 | 56.5 |
| −44$\mu$ (%) | 3.0 | 2.5 | 42.5 |

*AC = alumina to caustic

Table 1 shows the split between feed rate, overflow rate and underflow rate that can be achieved, the resultant concentration of solids in the well mixed portion of the tank, and the classification achieved. The ratio and caustic values indicate that the tank is operating as an effective precipitator, and the similarity between overflow and underflow liquor values indicates minimal by-passing.

While the above description refers to preferred embodiments of the invention, it will be appreciated by persons skilled in the art that various modifications and variations will be possible without departing from the spirit and scope of the present invention.

What I claim is:

1. A method of forming and partially classifying a precipitate containing large, coarse and fine particles from a supersaturated precipitating mother slurry, comprising separating the supersaturated precipitating mother slurry into a plurality of separate streams, separately and simultaneously introducing each stream as a slurry feed into a vessel provided with an agitated lower zone and a quiescent upper zone to form said precipitate, continuously removing product slurry as an underflow from the agitated lower zone of each vessel, and continuously removing spent liquor as an overflow from said quiescent upper zone, wherein said slurry feed, said underflow and said overflow are maintained such that said large and coarse particles accumulate as a slurry in the agitated lower zone of each vessel and only said fine particles exit said vessel with said overflow after migrating through said quiescent upper zone.

2. The method of claim 1, wherein said overflows from each said vessel are combined and said fine particles are separated from said spent liquor and are subjected to agglomeration to increase particle size.

3. The method of claim 1, wherein said underflows from each said vessel are combined and said large and said coarse particles are separated from each other by classification.

4. The method of claim 1, wherein said supersaturated precipitating mother slurry is obtained from a growth section of a precipitation circuit.

5. The method of claim 1, wherein said supersaturated precipitating mother slurry is a slurry produced during a Bayer process for the production of alumina.

6. The method of claim 5, wherein each of said slurry feed has a feed rate in the range of 3.0 to 6.0 m³/hour per m² of liquid surface area.

7. The method of claim 5, wherein each of said slurry feeds has a feed rate in the range of of 4.0 to 5.0 m³/hour per m² of liquid surface area.

8. The method of claim 5, wherein said spent liquor containing fine particles is removed from said quiescent upper zone of each said vessel at a rate in the range of 0.5 to 3.0 m³/hour per m² of liquid surface area.

9. The method of claim 5, wherein said spent liquor containing fine particles is removed from said quiescent upper zone of each said vessel at a rate in the range of 1.0 to 2.0 m³/hour per m² of liquid surface area.

10. The method of claim 1, wherein each slurry stream is fed to a vessel having a liquid outlet at an upper level thereof, wherein said spent liquor containing said fine particles is removed from said quiescent upper zone by causing said mother slurry in said quiescent upper zone to overflow said outlet.

11. The method of claim 10, wherein said overflow is caused by restricting removal of said slurry from said agitated lower zone while maintaining feed of said precipitating mother slurry to said vessel.

12. The method of claim 11, wherein said agitated lower zone has a variable density according to a ratio of solids to liquids present in said agitated lower zone, said density is monitored to produce a signal corresponding to measured density, and wherein said signal is used to control said underflow from said agitated lower zone to maintain said density within a specific range.

13. The method of claim 1, wherein solids in said underflow and said overflow are separated from spent liquor in said underflow and said overflow, and wherein some of said spent liquor thus separated from at least one of said underflow and said overflow is re-directed to said precipitating mother slurry introduced into said vessels to maintain an adequate flow of spent liquor through said quiescent upper zone and said overflow to achieve separation of said fine particles from said precipitating mother slurry.

14. In a particle precipitation system having a particle agglomeration zone, a particle growth zone, and a classification zone, wherein large, coarse and fine particles formed as a precipitate are separated from each other, the large particles are collected as product, at least some of the coarse particles are directed to the particle growth zone and at least some of the fine particles are directed to the particle agglomeration zone, the improvement which comprises separating a precipitating mother slurry exiting said particle growth zone, prior to said classification zone, into a plurality of separate streams, separately and simultaneously introducing each stream as a slurry feed into a separate vessel provided with an agitated lower zone and a quiescent upper zone to form said precipitate, continuously removing product slurry as an underflow from the agitated lower zone of each vessel, directing said underflow to said classification zone, and continuously removing spent liquor as an overflow from said quiescent upper zone, wherein said slurry feed, said underflow and said overflow are maintained such that said large and coarse particles accumulate as a slurry in the agitated lower zone of each vessel and only said fine particles exit said vessel with said overflow after migrating through said quiescent upper zone, and directing said fine particles from said overflow to said particle agglomeration zone.

15. A method of producing an alumina hydrate product from a pregnant liquor of sodium aluminate solution obtained from the digestion of alumina from bauxite, comprising the steps of:

introducing at least some of the pregnant liquor at a temperature in the range of about 70 to 80° C. into a particle agglomeration zone together with fine particles of alumina hydrate to cause said fine particles to agglomerate into coarse particles;

passing said pregnant liquor and coarse particles from said particle agglomeration zone into a growth zone and adding further coarse particles of alumina hydrate to cause a precipitate of alumina hydrate to commence to form in said growth zone, thus forming a precipitating mother slurry;

separating the precipitating mother slurry into a plurality of separate streams, and introducing each stream into a vessel provided with an agitated lower zone and a quiescent upper zone to form said precipitate comprising large, coarse and fine particles, with said large and coarse particles remaining as a slurry in the agitated lower zone and said fine particles migrating to said quiescent upper zone;

removing slurry from the agitated lower zone;

removing spent liquor containing said fine particles from said quiescent upper zone;

recirculating said fine particles from said quiescent upper zone to said particle agglomeration zone;

classifying said slurry from said agitated lower zone to separate said large and said coarse particles from each other;

recirculating said coarse particles to said growth zone; and extracting said large particles as an alumina hydrate product.

\* \* \* \* \*